FIG. 3A.
SERIES FIELD COIL CONNECTION

FIG. 3D.
PAIRS PARELLEL
PARALLEL PAIRS IN SERIES

FIG. 3B.
ALL COILS CONNECTED IN PARALLEL

FIG. 3E.
INSIDE COILS SERIES
OUTSIDE COILS PARALLEL

FIG. 3C.
OUTSIDE COILS SERIES
INSIDE COILS PARALLEL

FIG. 3F.
INSIDE COILS IN SERIES
(NO POWER TO OUTSIDE COILS)

United States Patent Office 3,705,975
Patented Dec. 12, 1972

3,705,975
SELF-STABILIZING ARC HEATER APPARATUS
Charles B. Wolf, Irwin, and Maurice G. Fey, Turtle Creek, Pa., assignors to Westinghouse Electric Corporation, Pittsburgh, Pa.
Filed Mar. 2, 1970, Ser. No. 15,446
Int. Cl. H05b 7/18
U.S. Cl. 219—383                                      18 Claims

ABSTRACT OF THE DISCLOSURE

An arc heater has two generally cylindrical electrodes which together with an upstream end plate form substantially the entire enclosure of an arc chamber. Two electrodes are electrically insulated from each other and separated by a very narrow gap through which process gas is brought into the chamber at a very high velocity through a substantially cylindrical path through the gap. A sufficient system voltage is maintained across the electrodes at all times to cause electrical breakdown between electrodes in the narrow gap. The arc initially forms in the gap, is quickly blown by the high velocity gas out of the gap into the chamber and may become elongated to a length whereat the voltage required to maintain the arc exceeds the breakdown voltage of the gap whereupon flashover in the gap occurs, the arc momentarily returning to the gap only to be immediately blown into the arc chamber and elongated again. Magnetic field coils in the electrode assemblies provide a magnetic field which exerts a force on the arc and causes it to rotate over the electrode surfaces. An upstream admission tube extending through the end plate is provided for bringing in additional feed stock in gaseous, liquid or solid form. The field coils may be connected in a variety of different circuits to provide field shaping as desired. The electrodes and field coils are part of electrode assemblies which include means defining passageways for the flow of cooling fluid to conduct heat flux from the arcing surfaces. The upstream electrode assembly is mounted on two pairs of linear hole bearings adapted to move on two axially extending tie rods, and all electrical, gas and water connections to the upstream electrode assembly are flexible so that the arc chamber can be opened without any major disconnecting of the equipment. When the chamber is opened, the electrodes may be slidably removed from the remainder of the assemblies.

CROSS-REFERENCE TO RELATED APPLICATIONS

This application is related to the copending application of M. G. Fey et al. for "A Recurrent Arc Heating Process," Ser. No. 790,417, filed Jan. 10, 1969; to the copending application of C. Hirayama et al. for "Improved Processes for Chemical Conversion," Ser. No. 829,452, filed June 2, 1969; to the copending application of M. G. Fey for "Apparatus and Method of Increasing Arc Voltage and Gas Enthalpy in a Self-Stabilizing Arc Heater," Ser. No. 15,597 filed March 2, 1970, all of the above-identified copending applications being assigned to the assignee of the instant invention.

BACKGROUND OF THE INVENTION

Field of the invention

The field of the invention utilizes an electric arc to heat one or more gases, one or more fluids, or one or more particulate solids, as the need requires. Where a gas is heated the object may be to impart a certain enthalpy to the gas in which process the electrical efficiency of the heating is always important. More particularly, the invention is directed to overcoming certain limitations in prior art devices where the velocity and hence the mass flow rate of gas admission has to be limited to avoid arc extinction and cumbersome reignition techniques. The apparatus is especially suitable for chemical processes in which one or more materials are heated to recombine as one or more different chemical products.

Description of the prior art

It is old in the art to have an arc heater formed with two axially extending electrodes, each of the electrodes having a magnetic field coil therein or therearound, the magnetic field coils generating magnetic fields which preferably oppose each other and produce a strong field component transverse to at least some portion of the arc path between electrodes, which exerts a force on the arc to move its substantially continuously over the arcing surfaces, the rate of rotation being great rotational speeds of about a thousand times per second and being easily obtainable. It is common to have a water-cooled segment or segments which enclose the space between electrodes and the spaces upstream and downstream of the electrodes to complete the arc chamber and serve the purpose of shielding the electrical insulation from arc radiation. It is further old in the art to have electrodes fluid cooled by passageways therein extending around the entire electrode to conduct heat flux from the electrode. Several arc heaters of this general description are shown and described in Pats. Nos. 3,296,479; 3,309,550; 3,343,019; and 3,445,191, all assigned to the assignee of the instant invention. Additionally, Pat. No. 3,372,296 issued Mar. 5, 1968 to J. T. Naff for "Arc Plasma Electrode Pair Having a Venturi-Shaped Configuration" introduces gas through a narrow gap into two electrodes defining cylindrical chambers. Further, Pat. No. 3,301,995 issued Jan. 31, 1967 to R. C. Eschenbach et al. for "Electric Arc Heating and Acceleration of Gases" employs a magnetic field within an arc chamber to direct the arc and increase the arc voltage.

It is old in the art to bring gas to a gap between electrodes through a plurality of peripherally spaced radially extending or tangentially extending passageways, as exemplified by Pat. No. 3,400,070 issued Sept. 3, 1968 to J. T. Naff for "High Efficiency Plasma Processing Head Including A Diffuser Having An Expanding Diameter."

The prior art also includes plasma generator apparatus described in Technical Documentary Report No. RTD–TDR–63–4055 dated February 1964, entitled "Development of High Enthalpy, High Power Arc Air Heaters" prepared by Speedway Research Laboratory, Indianapolis, Indiana for the AF Flight Dynamics Laboratory, Research and Technology Div. Air Force Systems Command, Wright-Patterson Air Force Base, Ohio, released to the Office of Technical Services, U.S. Department of Commerce, Washington, D.C. for sale to the general public.

SUMMARY OF THE INVENTION

An arc heater has two generally cylindrical axially extending electrodes slidably removable from electrode assemblies, the inner surfaces forming the arcing surfaces of the electrodes, the electrodes having their ends adjacent each other with curved portions extending a short distance in a radial direction and a very narrow gap therebetween. The source of potential which supplies the arc current has a system voltage at all times sufficient to cause electrical breakdown in the narrow gap between the radially extending portions of the adjacent electrodes. For this and other reasons, gas at a very high velocity of at least several hundred feet per second and approaching the velocity of sound can enter the arc chamber through the gap and is uniformly admitted in a generally radial path through the gap by way of two spacer rings which are electrically insulated from each other, each of the spacer rings having peripherally spaced, radially extending slots or grooves around the entire periphery thereof through which gas or fluid passes from gas headers for the electrodes respectively. Each electrode is part of an electrode assembly and has the arcing surface thereof fluid cooled, and each electrode assembly has two axially spaced magnetic field coils therein which together extend substantially the entire length of the electrode. Circuit means are provided for connecting the field coils in a variety of electrical circuit configurations including series and parallel connections to adjust the strength and shape of the magnetic fields. The arc which is initiated in the narrow gap between electrodes upon electrical breakdown is rapidly blown out of the gap by the very high velocity gas or fluid and becomes elongated with the ends extending down the electrodes respectively in directions away from the gap, and when the arc becomes so elongated that the voltage required to maintain the arc exceeds the breakdown voltage of the gap, flashover occurs in the gap and the arc momentarily returns to the gap only to be immediately blown back into the arc chamber and elongated. The magnetic field coils extend so far down the electrodes that even though the arc attaches to an electrode a great distance from the gap there is still sufficient magnetic field strength to exert a force on the arc to cause it to move substantially continuously over the electrode within the arc chamber. The upstream electrode assembly is secured to two pairs of linear ball bearings which run on two axially extending tie rods which are anchored to the downstream electrode assembly. All process material, cooling fluid, and electrical connections to the upstream electrode assembly are flexible so that the arc chamber can be quickly opened without disconnecting any major equipment.

Additionally, another fluid, or more of the same fluid which is admitted at the gap between electrodes, may be introduced in a generally annular path between the upstream end plate and the upstream electrode.

Further, there is an opening generally centrally disposed in the fluid cooled end plate, through which extends an admission tube through which a particulate solid as well as other gases or fluids can be admitted to the arc chamber. This feed tube is disposed within a long tubular member formed integral with a flange portion which is secured by peripherally spaced bolts to the end plate which closes the upstream end of the arc chamber.

Means are provided for quickly releasing the upstream electrode so that the arc chamber may be quickly opened.

The electrodes by way of electrically conductive portions of the electrode assemblies are adapted to be electrically connected to a source of potential for producing an arc. Various gas inlet headers are provided in the structure as well as various fluid headers and fluid inlets and fluid outlets.

In an additional embodiment, the electrodes are especially shaped to provide additional and more efficient cooling of the portion of the arcing surface adjacent the gap between electrodes. In another embodiment, the end plug has no tube for admitting a particulate solid but is efficiently fluid cooled.

Additionally, a portion of the wall of the electrode which encloses the fluid passageway back of or is spaced from the arcing surface by the wall of the electrode and particularly the portion adjacent to the gap between electrodes and extending for a short distance in an axial direction from the gap, has spoilers in the wall thereof to improve heat transfer from the metal of the electrode to the cooling fluid.

DESCRIPTION OF THE PREFERRED EMBODIMENT

Figure 1A:
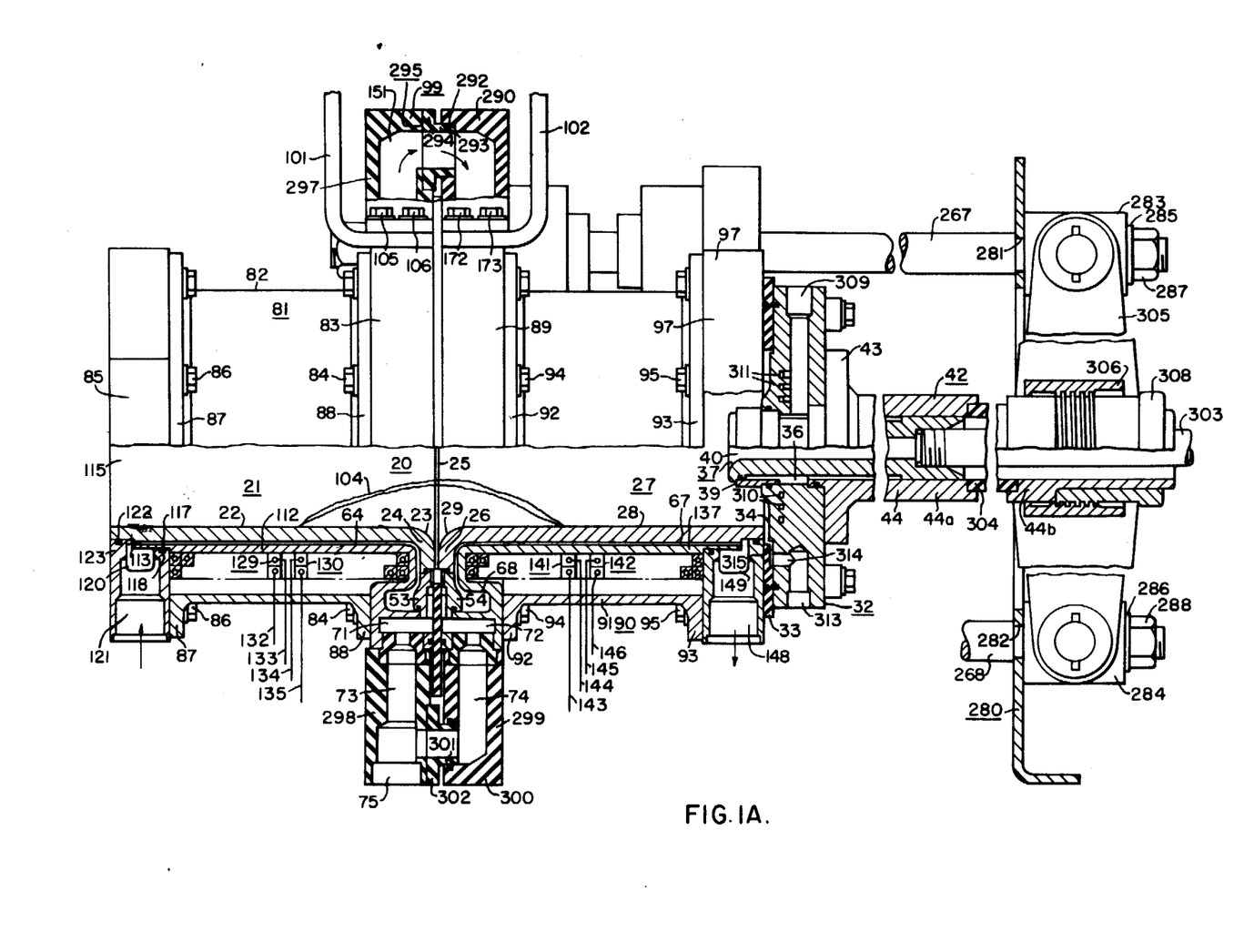
FIG. 1A is a view partially in section and partially in elevation showing the arc heater apparatus according to the preferred embodiment thereof.

Particular reference is made to FIG. 1A. The arc chamber generally designated 20 is seen to be enclosed by a downstream electrode generally designated 21 having a cylindrical portion 22 of substantial length, a curved portion 23, and a radially extending portion 24 separated by short gap 25 from the radially extending portion 26 of an upstream electrode generally designated 27 having a cylindrical portion 28 and a curved portion 29. An end plate generally designated 32 closes the upstream end of the arc chamber and may be electrically insulated from the upstream electrode by the insulating or metallic disc member 33, there being a space 34 extending around the entire circumference of the adjacent end of electrode 27 and between it and the wall of the end plate 32 for the admission of an additional gas or fluid if desired, in a manner which will become hereinafter more clearly apparent. The end plate 32 has a generally centrally disposed bore or aperture 36 therein through which passes a feed stock tube 37 especially suitable for bringing a particulate solid into the arc chamber 20 but also for bringing a suitable additional gas or fluid. A spacer tube 39 controls the axial position of the admission of the secondary feed stock through passageway 40, it being understood that in practice a number of spacer tubes 39 of different lengths are provided and kept available so that the axial position at which feed stock material is brought in through passageway 40 can be adjusted by substituting a spacer tube of one length for a spacer tube of a different length. Secured to the end plate 32 is a feed tube housing or assembly generally designated 42 having a flange portion 43 formed integrally with an elongated tubular portion 44 composed of portions 44a and 44b separated and electrically insulated from each other by insulating portion or insulating sleeve 304, the flange portion 43 being secured to end plate 32 by peripherally spaced bolts, the bolts not being shown for convenience of illustration.

Figure 1B:
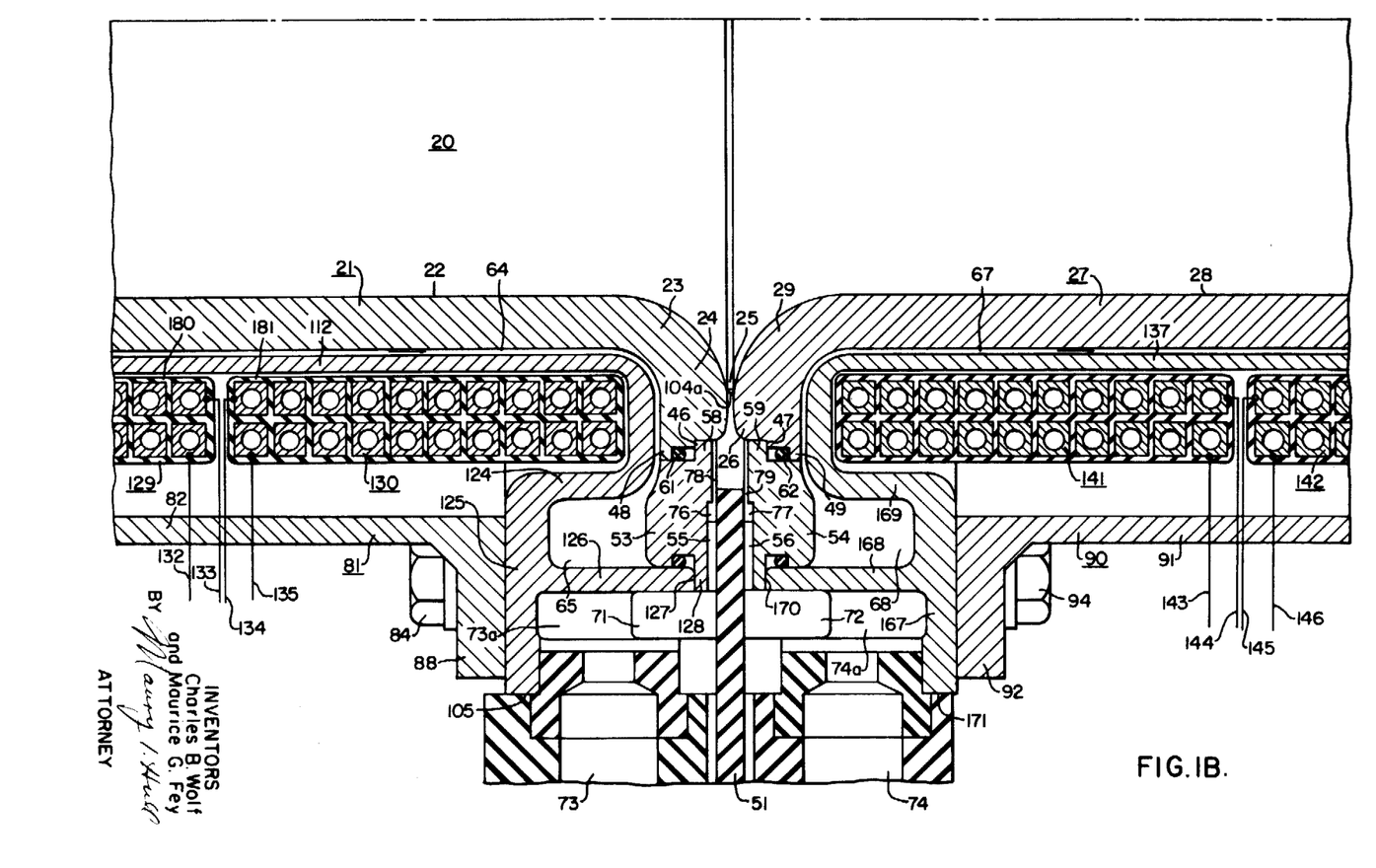
FIG. 1B is an enlarged view of a portion of the apparatus of FIG. 1A.
Figure 4:
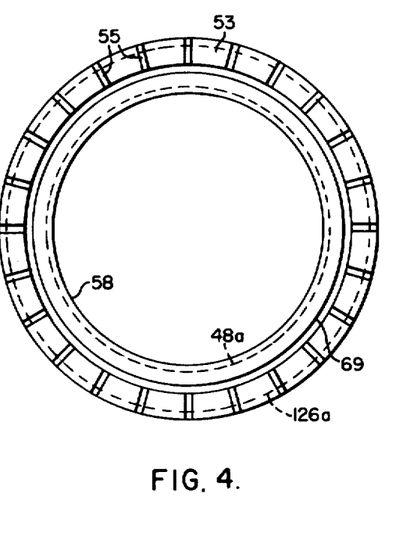
FIG. 4 is a plan view of the rings having radially extending slots or bringing gas into and through the gap between electrodes in a radial path.

Referring to FIG. 1B it is seen that the radially extending portions 24 and 26 of electrodes 21 and 27 respectively are not of uniform thickness throughout. The electrodes have annular shoulders 46 and 47 extending therearound formed by radially extending lips 48 and 49 respectively. The spacing between the electrodes generally designated 21 and 27 and the width of the aforementioned gap 25 are maintained at their desired dimensions by a gap insulating ring 51 composed of electrically insulating material having mounted on each side thereof one of the slotted manifold rings 53 and 54 respectively, each of the manifold rings having a plurality of radially extending slots 55 and 56 thereacross respectively, a view of the slotted manifold rings is shown in FIG. 4 to which particular attention is directed, where for example, slotted manifold ring 53 is shown in elevation having slots 56 therein. It is seen, FIG. 1B, that each of the slotted manifold rings 53 and 54 has an annular ridge or extended portion 58 and 59, respectively, which annular ridge portions 58 and 59 extend to the aforementioned annular shoulders 46 and 47 of the electrodes generally designated 21 and 27 respectively, preventing the electrodes 21 and 27 from undergoing axial movement toward each other. A pair of O-rings 61 and 62 provide sealing engagement between the electrodes 21 and 27 and the manifold rings 53 and 54 respectively. Gas or other fluid enters the arc chamber 20 through the slots such as 55 and 56 in the manifold rings. A cooling fluid flows through passageway 64 back of the wall portion 22 which forms the arcing surface of electrode 21 and thence into fluid headers 65, and a cooling fluid such as water flows in passageway 67 back of the wall 28 forming the arcing surface of electrode 27, the passageway 67 for the flow of cooling fluid to conduct heat flux from the arcing surface communicating with the water or fluid header 68 in the upstream electrode assembly in a manner which will be described hereinafter in greater detail.

Referring again to FIG. 1A it can be seen that the slots in the slotted manifold rings extend to and communicate with a pair of chambers 71 and 72 which extend around the entire arc heater and which have gas under pressure supplied thereto through passageways 73 and 74 to be described hereinafter in greater detail, passageways 73 and 74 communicating with a single gas inlet 75 as shown.

Slots 55 and 56, shown in FIG. 1B, do not extend radially across the entire manifold rings, but terminate in fluid header portions 76 and 77.

From fluid headers 76 and 77 gas or fluid passes through very narrow annular gaps 78 and 79 respectively into the space outside the electrode gap 25, and thence through the electrode gap.

It will be understood, and it will be explained more fully hereinafter, that the structures forming and enclosing passageways 73 and 74 are separable from each other when the arc chamber 20 is opened, without the necessity of doing anything more than slipping one piece out of another, as will be seen.

Referring again to FIG. 1A, generally speaking, the aforementioned downstream electrode generally designated 21 may be considered part of a downstream electrode assembly generally designated 81 including a field coil case 82 generally semi-cylindrical in shape and having at the ends thereof flange portions 87 and 88, flange portion 87, FIG. 1A being secured to a polygonal plate 85 by peripherally spaced bolts 86, flange portion 88 being secured to polygonal plate 83 by peripherally spaced bolts 84. The upstream electrode generally designated 27 may be considered part of an upstream electrode assembly generally designated 90, having a field coil base 91 which it is understood is formed in two semicylindrical sections, the field coil case 91 having flange portions 92 and 93 at the ends thereof secured by peripherally spaced bolts 94 and 95 respectively to polygonal plates 89 and 97 respectively.

Paying particular attention to the insulated quick disconnect manifold generally designated 99, which will be described in greater detail hereinafter, the quick disconnect manifold, or more specifically the passageways thereof, pass through holes in the plates 83 and 89. The terminal connections 101 and 102 are provided for bringing current to the electrode which forms the arc 104 therebetween and shown in an elongated form, FIG. 1A, such as that which might occur shortly before the arc became so elongated that breakdown occurs in the narrow gap between electrodes. From terminal 101 a current path to electrode 21 is provided as follows: it is seen, FIG. 1B, that back of the electrode 21 and spaced from the outside wall (of larger diameter) thereof to define fluid flow passageway 64 is an additional cylindrical member 112 composed of electrically conductive material and which forms part of the electrode assembly, member 112 having a U-shaped portion 124 with a radially extending flange portion 125 terminating in edge or surface 105, and an axially extending annular flange portion 126 the end or edge 127 of which is in firm electrical contact with slotted manifold ring 53. As previously stated, manifold ring 53 is in firm electrical contact with electrode 24 where annular lip or ridge portion 58 engages shoulder 46 of the electrode. Surface 105 is tightly clamped against terminal 101 by bolts 105 and 106, FIG. 1A. The current path to the arcing surface of electrode 21 then, is through terminal 101, radially extending flange portion 125, axially extending flange portion 126, manifold ring 53 including lip portion 58 thereof, to radially extending portion 24 of the electrode.

In like manner, bolts 172 and 173, FIG. 1A, firmly clamp terminal 102 against the edge 171 of radially extending flange portion 167 of electrically conductive member 137 of the upstream electrode assembly; thence current flows through aforementioned flange portion 167, through axially extending flange portion 168, through the firm electrical contact at 170 between portion 168 and manifold ring 54, through the ring 54 including the annular lip portion 59 thereof, to the radially extending lip portion 26 of electrode generally designated 27.

It will be understood that the structure defining gas inlets 73 and 74 does not extend around the entire arc heater, the circumferentially extending gas headers 71 and 72 opening into all the slots in the two manifold rings, so that clamping the terminals 101 and 102 against surfaces 105 and 171 respectively as described above at another position around the circumference of the heater as indicated in FIG. 1A may be conveniently accomplished. It will be further understood that when the two electrode assemblies are clamped together to seal the arc chamber, in a manner to be hereinafter described, further tightening of contacting electrically conducting surfaces may occur.

As previously stated, both of the manifold rings 53 and 54 are annular, extend around the entire perimeter of the arcing chamber and are in firm electrical contact with the adjacent end of the electrodes respectively at substantially every point around the entire perimeter of the electrodes, providing an ample current path for the arc current which may attain a value of several thousand amperes.

Figure 2A:
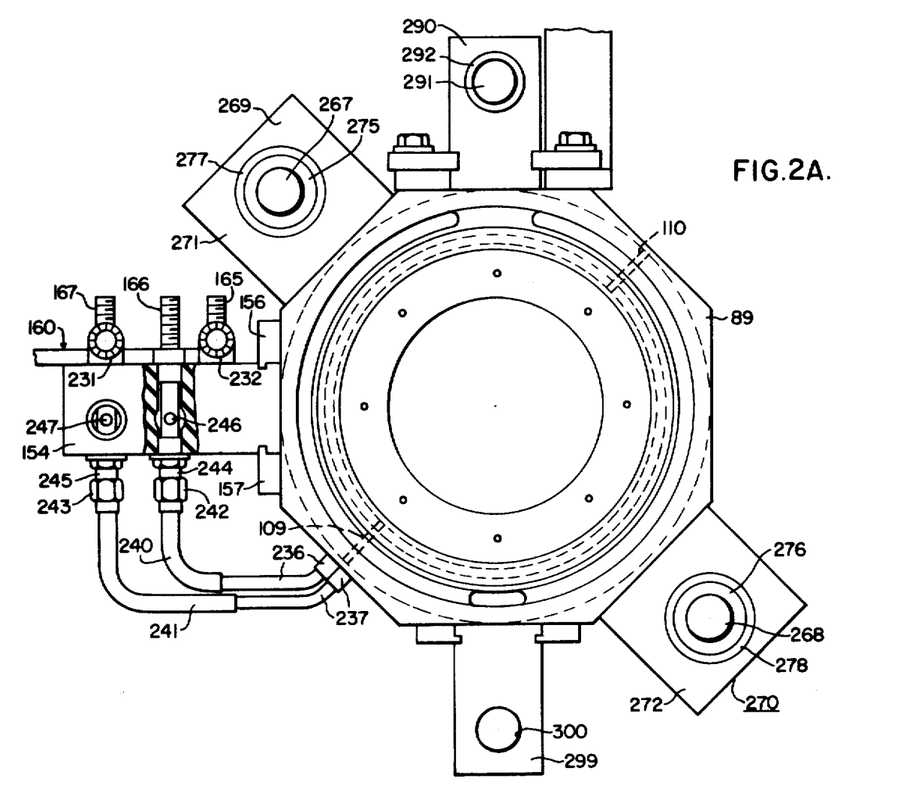
FIG. 2A is a sub-assembly view of the upstream electrode field coil case and other parts as seen with the electrode removed, looking into the field coil case.

In further detail, the downstream electrode assembly generally designated 81 includes the field coil case 82 which as aforementioned is in two semicylindrical sections, the break between sections being shown at 109 and 110 in dashed lines in FIG. 2A. The aforementioned fluid passageway 64 in electrode 21 is as aforementioned located between the wall portion of the electrode 22 which forms the arcing surface and an additional metallic member 112 having the shape shown in FIG. 1A with a portion 113 of reduced outside diameter at the end thereof near the exhaust opening 115, where heated gas exits from the arc chamber 20. The outside surface of portion 113 makes close fitting engagement with an adjacent inner cylindrical surface of the aforementioned polygonal plate 85. O-rings seated in an annular groove provides fluid tight seals where needed. One such O-ring 122 seated in annular groove 123 provides a fluid tight seal between the inner cylindrical surface of the plate 85 and the adjacent outside wall of electrode portion 22. The aforementioned fluid passageway 64 communicates at the upstream end thereof with a fluid header 120 which in turn communicates with fluid inlet 121.

As aforementioned, the end of the member 112 in the area of the gap 25 between electrodes is seen to have a generally U-shaped portion 125, having a radially extending flange portion 125 which in turn has the radially spaced and axially extending flange portion 126 which closely abuts against and snugly fits an extending rim or flange portion 128 of the aforementioned slotted manifold ring 53, firmly securing the manifold ring against movement. Within the cylindrical space between member 112 and the wall 82 of the field coil case there are disposed two magnetic field coils, each of the coils consisting of a number of turns of hollow conduit, the coils of the downstream electrode being designated 129 and 130, the coil and coil leads being completely encompassed by electrically insulating material, the insulation, not being shown for convenience of illustration in FIG. 1A but the coil housings being shown at 180 and 181, FIG. 1B. The coil 129 in FIGS. 1A and 1B has leads 132 and 133 symbolizing means for making electrical connection thereto which should be considered with FIGS. 3A–3F inclusive, but it will be understood that the current to the field coil flows through conduit extensions, which are not only connected to fluid outlet and fluid inlet means but by way of the terminal arrangements of FIGS. 3A–3F to selected terminals of a source of potential. The coil generally designated 130 has leads to the ends thereof designated 134 and 135 provided to assist in describing the electrical connection of the coil, but it will be understood that the field coil 130 is composed of turns of hollow conduit; the conduit extensions serve not only for bringing cooling fluid to and from the coil, but provide electrical connections for bringing an energizing current to the field coil, as will be seen more clearly hereinafter in connection with a description of FIG. 3A–3F.

The upstream electrode assembly designated 90 is similar to the downstream electrode assembly, the fluid passageway between the aforementioned wall portion 28 of electrode 27 and the member of electrically conductive material 137 being shown at 67. Within the upstream electrode assembly 90 there are two field coils generally designated 141 and 142; conduit extensions to both the coils bring cooling fluid to and from the coils and supply energizing current thereto, but to assist in understanding the invention, coil 141 is shown as having symbolic leads 143 and 144 to the ends thereof and coil 142 has symbolic leads 145 and 146 to the ends thereof.

Cooling fluid for both electrodes enters through fluid inlet 121 and header 120 which it is understood extends around the entire electrode structure, from thence through the cylindrical fluid passageway 64 in the downstream electrode, thence into fluid header 65 which passes around the entire downstream electrode assembly, thence through the passageway 151 in the quick disconnect manifold generally designated 99 and following the path of the arrows therein, thence into fluid header 68 which extends around the entire upstream electrode assembly, thence through passageway 67 in the upstream electrode, thence into fluid header 149 which extends around the entire upstream electrode, fluid from fluid header 149 passing through the fluid outlet 148.

Particular reference is made to FIG. 2A. Each electrode assembly has an axially extending block of insulating material secured to the polygonal plates at the ends of the electrode assembly, the matching plate for the downstream electrode assembly not being shown for simplicity of illustration, but it will be understood that it extends between polygonal plates 85 and 83. In FIG. 2A, the insulating block 154 for the upstream electrode assembly is shown, block 154 being secured to polygonal plate 89 by two retaining blocks 156 and 157 at the end thereof, centrally disposed along the axis of the electrode, it being understood that retaining blocks 156 and 157 are secured to the octagonal plate 89 by bolts, not shown for convenience of illustration. The other end of the block of insulating material 154 is likewise secured to polygonal plate 97, FIG. 1A, by two retaining blocks similar to 156 and 157, but not shown for convenience of illustration, and having bolts, not shown, which pass therethrough into threaded bores in the polygonal plate 97.

Particular reference is made to FIGS. 3A–3F where plan or side elevational views of the blocks for both the upstream and downstream electrode assemblies are shown, the apparatus being suitable for mounting in either position. In FIGS. 3A–3F the insulating block for the upstream electrode as aforementioned is 154 and the insulating block for the downstream electrode assembly is 155. It is seen that each of the blocks has an electrical terminal strip secured thereto, the terminal strip for block 155 being shown at 159, FIG. 3A, and the terminal strip for block 154 being shown at 160, FIG. 3A, and in FIG. 2. Terminal strip 160 is connected by lead 161 to a terminal of one polarity of a source of potential shown in block form at 162 for energizing the field coils the terminal of other polarity of the source 162 being connected by lead 163 to the aforementioned terminal plate 159 of block 155. The studs shown as extending from terminal plate 154 it is understood are illustrative and include studs 165, 166 and 167, all also shown in FIG. 2A, as well as, FIG. 3A, studs 212, 213, 214, 215, 209, and 210.

Figure 3A:
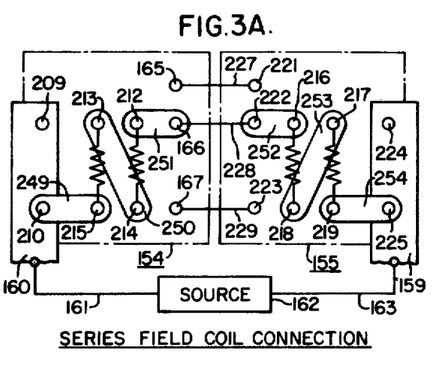
FIGS. 3A to 3F inclusive show terminal boards having studs electrically connected to the terminals of the four field coils, two of the field coils being within each electrode assembly, for connecting the field coils in six different electrical circuit arrangements to control the strength and orientation or shape of the magnetic field or fields.

The studs on insulating block 155 include 221, 222, 223, 216, 217, 218, 219, 224 and 225. It is seen that the latter two studs 224 and 225 are connected to terminal plate 159, whereas studs 209 and 210 of insulating block 154 are connected to the electrical terminal strip 160.

Figure 2B:
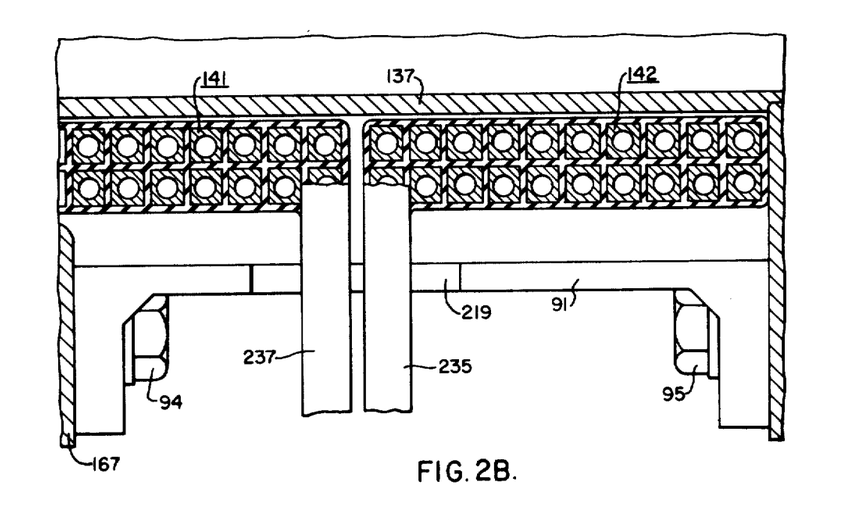
FIG. 2B is a fragmentary view showing the space between semicylindrical coil housings and field coil conduit extensions.

As previously stated, the chamber of the arc heater is adapted to be opened by moving the upstream electrode on ball bearings away from the downstream electrode. Lead connection 227, FIG. 3A, between studs 165 and 221 symbolizes a permanent electrical connection therebetween, while lead 228 between studs 166 and 222 symbolizes a permanent electrical connection therebetween for completing the electrical circuit, and lead 229 symbolizes a permanent electrical connection between studs 167 and 223 for completing an electrical circuit therebetween. In actuality secured to terminals 221, 222 and 223 are rigid conduit portions extending substantially parallel to the longitudinal axis of the arc heater, which conduit portions are engaged by contact finger assemblies secured to terminals 165, 166 and 167 respectively, two of these conduit finger assemblies being shown at 231 and 232, FIG. 2A. Finger assembly 231 engages conduit extension 229 while finger assembly 232 engages 227. As previously stated, whereas for convenience of illustration the four field coils shown in FIG. 1 are shown as having symbolic electrical leads thereto so that the electrical circuit for energizing the coils can be traced, in actuality extension of the conduit which forms the field coils serve for bringing current to the coils as well as for bringing cooling fluid. Two of these conduit ends or extensions are shown in FIG. 2A at 236 and 237, the conduit portions adjacent the electrode assembly being electrically insulated. The coil housings for the two electrode assemblies are each in two semicylindrical sections with gaps therebetween shown at 109 and 110, FIG. 2A, one of the gaps also being shown in FIG. 2B. At about the axial center of the cylindrical coil housings at the gap, there are symmetrical cutaway portions on the adjoining edges of each of the semicylindrical portions, one of the cutaway portions being shown at 219, FIG. 2B, to provide sufficient space for the passage of four conduits representing extensions of the two field coils of the electrode assembly, two of the conduit extensions being shown at 237 and 235, FIG. 2B. The conduits 236 and 237, FIG. 2A, may correspond electrically to the leads 143 and 144 respectively, FIG. 1A. By extensions 240 and 241 respectively which are also composed of electrically conductive material, threaded connections are made at 242 and 243 respectively to the ends of two tubes 244 and 245 respectively which extend through the block of insulating material of the upstream electrode assembly, the block as aforementioned being designated 154. A portion of the block is shown broken away to show fluid manifolds at 246 and 247 for bringing a cooling fluid into the coils for circulating therein and for exhausting cooling fluid from the coils generally designated 141 and 142 after the fluid has circulated therethrough. The manifolds 246 and 247 extend through the block for fluid connections to both of the aforementioned coils. It will be understood that where substantially pure water is used as the cooling fluid, the electrical conductivity is very low and since the block is composed of electrically insulating material, no further insulation is necessary. The two additional conduits connected to the inner and outer turns at the left-hand end of field coil 142, FIG. 1A, these conduit extensions outside of the arc heater not being shown for convenience of illustration, as well as opening into manifolds 246 and 247 also have the ends thereof extending in the form of threaded terminal studs from the insulating block 154. In FIG. 2A, the three threaded studs shown 165, 166 and 167 are provided for electrical connection to three threaded studs 221, 222 and 223 respectively on the insulating block of the downstream electrode assembly and it will be understood that none of the threaded studs 167, 166 and 165 are electrically connected by means other than the terminal board to either of the conduits which form the coil extensions, that is, conduits 236 and 237. In FIG. 3A, studs or terminals 213 and 215 represent direct electrical connections to the conduits from the field coil generally designated 142, and threaded studs 212 and 214 represent direct electrical connections to the two conduit extensions which form the ends of field coil generally designated 141, both field coil 141 and coil 142 being part of the upstream electrode assembly. Accordingly, since a view of FIG. 2A is a view at the downstream end looking toward the end plate at the far end of the upstream electrode assembly, threaded studs 212 and 214 would lie back of studs 166 and 167 which appear in the drawing of FIG. 2A and threaded studs 213 and 215 would lie back of the aforementioned studs 212 and 214, with the threaded studs 209 and 210 which are secured to electrical terminal plate 160 lying still further back at a more remote axial position along the length of the electrode assembly.

The aforementioned terminal block 155 for the downstream electrode assembly as aforementioned has three threaded studs 221, 222, and 223 substantially radially aligned with corresponding three studs on insulating block 154. In addition, insulating block 155 has threaded studs 216, 217, 218 and 219 which represent direct electrical connections to the conduit extensions which form the ends of the field coils generally designated 129 and 130, of the downstream electrode assembly. Terminals 216 and 218 are directly connected electrically to the conduit extensions emerging from the leftmost inner and outer turns of field coil 130, and for the purpose of tracing the electrical circuit, terminal 216 may be thought of as corresponding to lead 135, FIG. 1, and terminal 218 may be thought of as corresponding to lead 134, FIG. 1. In like manner, terminals 217 and 219 on insulating block 155 are directly connected to the conduit extensions from the field coil generally designated 129 of the downstream electrode assembly, and for the purposes of following the electrical circuit, terminal 217 may be thought of as corresponding to lead 132, FIG. 1A, and terminal 219 may be thought of as corresponding to lead 133, FIG. 1A. As previously stated, the insulating block 155, FIG. 3A, also has threaded studs 224 and 225 extending from the electrical terminal strip 159 connected to a terminal of one polarity of source 162.

The link arrangement of FIG. 3A shows all four field coils of the two electrode assemblies connected in series, with link 249 interconnecting terminals or studs 210 and 215, link 250 interconnecting studs 213 and 214, link 251 interconnecting studs 212 and 166, link 252 interconnecting studs 222 and 216, link 253 interconnecting studs 218 and 217, and link 254 interconnecting studs 219 and 225, completing an electrical circuit wherein all of the coils are connected in series between terminal plate 160 and terminal plate 159.

Figure 3B:
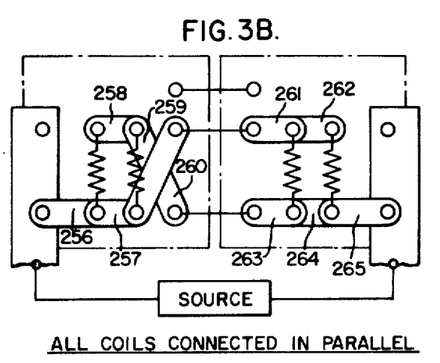

Particular reference is made to FIG. 3B wherein links effectively connect all four coils in parallel across the source of potential 162. Where links cross each other, spacer washers, not shown, are used to displace one link in height from the other so that electrical contact will be avoided. It will be understood that nuts secure the various links in the various figures to the various threaded studs. In FIG. 3B, link 256 connects stud 215 to stud 210, whereas link 257 connects stud 215 to stud 214, and link 259 connects stud 214 to stud 166. Link 258 interconnects studs 213 and 212, while link 260 interconnects studs 212 and 167. Link 261 interconnects studs 222 and 216, whereas link 262 interconnects studs 216 and 217. Link 263 interconnects studs 223 and 218, link 264 interconnects studs 218 and 219, and link 265 interconnects studs 219 and 225. It is seen that an electrical circuit is formed in which all of the coils are interconnected in parallel with the full voltage from source 162 applied across each one of the magnetic field coils.

Figure 3C:
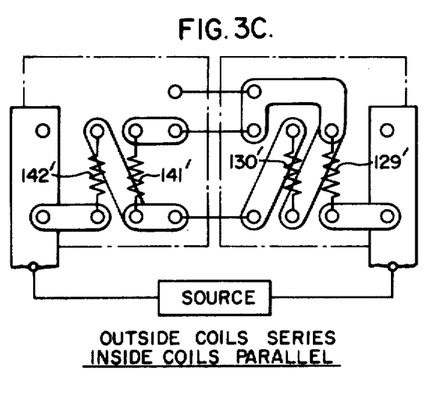
Figure 3D:
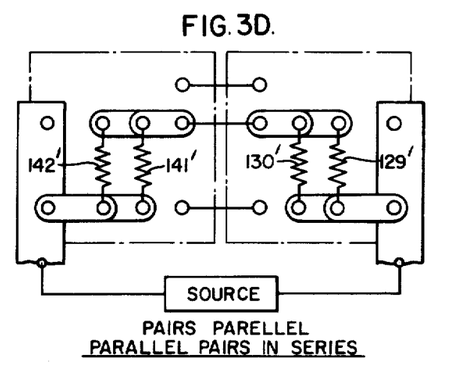
Figure 3E:
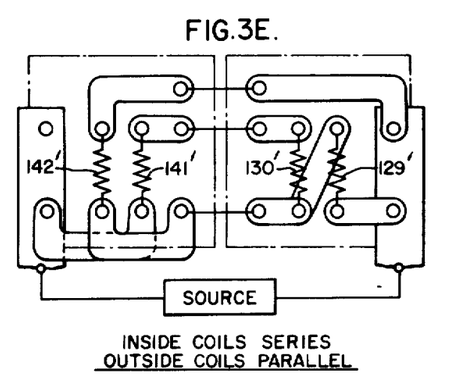
Figure 3F:
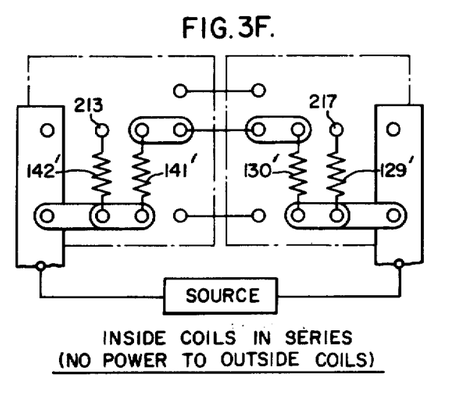

Particular reference is made to FIG. 3C wherein an electrical circuit is shown in which the outside coils of the two electrode assemblies symbolized by 142' and 129' are connected in series and the inside coils of the two electrode assemblies symbolized by 141' and 130' are connected in parallel. The term "outside coil" as employed herein refers to that field coil of the two field coils of each electrode assembly which is most remote from the gap between electrodes.

In FIGS. 3C through 3F, the threaded studs all have positions which correspond to the studs described hereinabove in detail with respect to FIG. 3A and FIG. 3B, and the result of the link arrangement shown in each of the drawings 3C–3F is indicated in the drawing legend showing the resulting connection of the coils, so that it is believed the connections will be clear to one skilled in the art and the electrical circuits will be readily apparent from the studs and the link connections shown.

The purpose of the terminal boards in which the connections of the coils may be altered to provide a wide variety of connections including connections in which one coil of each pair is not energized at all, is to permit maximum versatility in adjusting the magnetic field strength and magnetic field configuration within the arc chamber to insure rotation of the arc at the desired speed whatever the nature of operating conditions in the arc chamber, including rotation of the arc no matter how extended it becomes and how remote the points of arc spot attachment are from the gap between electrodes, and also, for example, to permit adjustment of the force or forces exerted on the arc by the magnetic field as a particulate solid is admitted through the feed opening 40 in the feed tube extending through the end plate which closes the upstream end of the electrode. It will be understood that a particulate solid admitted through this feed tube has the effect of increasing the density of the gas in the arc chamber or increasing the viscosity, which increase may result in a slowing of the arc rotation below that which would normally be obtained in the absence of a particulate solid introduced into the arc chamber, and that it may be desirable to adjust the magnetic field strength of the field or fields which exert forces on the arc to cause the proper movement thereof.

Adjustment of the magnetic field or fields may also be desirable where a switch is made from a direct current arc to an alternating current arc. In general, where direct current supplies the arc, the cyclic process of arc elongation and breakdown in the gap may occur many times per second, whereas when alternating current supplies the arc, the return of the arc to the gap may occur once per alternation following current zero, and where the power supply frequency is 60 cycles per second, the arc may return to the gap 120 times per second. Depending upon the velocity and to some extent on the mass flow rate of gas admitted through the gap, the length of arc elongation may vary, and it may be desirable to adjust the magnetic field strength and/or configuration.

As previously stated, the upstream electrode assembly is mounted on linear ball bearings so that when released from its clamped position, it may be moved away from the downstream electrode assembly to provide easy access to the arc chamber 20. Particular reference is made to FIG. 2A. Tie rods 267 and 268 extend in directions generally parallel to the longitudinal axis of the arc heater, the tie rods 267 and 268 also being shown in FIG. 1A. The bearing block assemblies are generally designated 269 and 270. Each bearing block assembly includes a ball bearing block 271 and 272 respectively, these being secured to the outside of the arc heater by four bolts extending through each of the blocks, the bolts not being shown for convenience of illustration the bolts extending into threaded bores, not shown, in the outside wall of the arc heater and retaining the blocks in position thereon. Each block has therein a plastic bearing holder 277 and 278 respectively which generally speaking is made in square form and turned round on the ends, the bearings themselves being shown in FIG. 2A and designated 275 and 276 respectively.

As seen in FIG. 1, there is a support bracket generally designated 280 for the remote ends of the tie rods, these being of reduced diameter and fitting snugly in bores 281 and 282 of the support bracket and having a pair of trunnions 283 and 284 on extensions thereof on the right-hand side of support bracket 280, as seen in FIG. 1, these trunnions 283 and 284 being provided for purposes to be made hereinbefore more clearly apparent. On the right-hand end of the rods 267 and 268 as they emerge from the trunnions, which ends are threaded, there are washers 285 and 286 respectively and nuts 287 and 288 respectively.

Paying particular attention to FIG. 2A, as previously stated the upstream and downstream electrode assemblies are easily separable, and there is a quick disconnect fluid manifold having one portion secured to the downstream electrode assembly and one portion secured to the upstream electrode assembly, and there is also a quick disconnect gas inlet structure with one portion secured to the downstream electrode assembly and the other portion secured to the upstream electrode assembly. In the portion 290 of the aforementioned quick disconnect manifold which is secured to the upstream portion of the arc heater, there is an annular opening 291 and a portion of this opening has an outside diameter of larger dimension forming the bore 292 upon which, when the entire disconnect manifold is assembled and the two electrodes are as close together as the insulating plate 51 will permit, engages the tubular member 293 having an annular flange portion, the surface 295 of which firmly fits against the adjacent portion 297 of the quick disconnect manifold, which portion 297 is secured to the downstream electrode assembly. Whereas both portions 290 and 297 are shown as composed of electrically insulating material, one of these portions may be composed of conductive material, since the water, which serves as the cooling fluid, is fairly pure and has a low electrical conductivity. O-rings, not shown for convenience of illustration, seated in grooves, not shown for convenience of illustration, form fluid tight seals between member 293 and portion 290, and between flange portion 294 and portion 297.

Paying particular attention to the gas inlet arrangement shown in the lower portion of the drawing of FIG. 1, there is portion 299 secured to the upstream electrode assembly and a portion 298 secured to the downstream electrode assembly; whereas both of these portions are shown as composed of electrically insulating material, only one portion need be composed of electrically insulating material. The portion 299, FIG. 2A, is seen to have a cylindrical opening therethrough designated 300 through which passes a tubular member 301, FIG. 1, having a flange portion 302 which is forced into firm engagement with an adjacent portion of the general structure 298 which is secured to the downstream electrode assembly, and when the electrodes are joined to form the arc chamber, the tubular member 301 passes through the opening 300 forming a snug fit. O-rings seated in annular grooves are provided where needed to provide a fluid tight seal between the tubular member 301 and the adjacent wall portion of member 299, and also to provide a fluid tight seal between the flange portion 302 and the adjacent wall portion of the gas inlet structure 298.

Particular reference is made to FIG. 1. The feed tube generally designated 37 is seen to terminate at a selected axial position within the tubular portion which is integral with the admission tube assembly 42. Threaded into the end of the feed tube 37 is a plastic feed stock tube 303. The aforementioned trunnions 283 and 284 have secured thereto the removable links or arms 305, with an admission tube trunnion 306 having a passageway therethrough for the sleeve portion 44 of the admission tube assembly 42, having the flange 43 formed integral therewith, the flange being secured to the end plate 32, the tube assembly having a threaded locking nut 308 which secures it in position in trunnion 306. As seen in FIG. 1, an insulating sleeve 304 separates the sleeve portion 44 of the feed tube assembly into two portions electrically insulated from each other.

The feed tube 303 extends to a hose connection, not shown for convenience of illustration, which it is understood connects with a feeding device for feeding a secondary feedstock into the arc chamber when desired through the aforementioned opening 40.

The aforementioned end plate 32 is fluid cooled, having a fluid inlet passageway 309 and having therein a plurality of radially spaced circumferential passageways 310 with holes communicating between these passageways and fluid inlet 309, the holes being shown at 311. It will be understood that there is also a fluid exit, not shown in the plane selected for illustration, communicating by way of other holes, not shown, with the cylindrical passageways 310 so that fluid passing through these cylindrical or circumferential passageways may be exhausted from the end plate after heat has been transferred to the fluid.

The end plate 32 also has a gas inlet 313 communicating with a gas header 314 whence gas passes through a plurality of radially extending peripherally spaced slots or grooves 315 in the ring 33, and thence through the space 34 into the arc chamber 20, this means of admitting an additional gas into the arc chamber being used or not used at the will of the operator.

Figure 5:
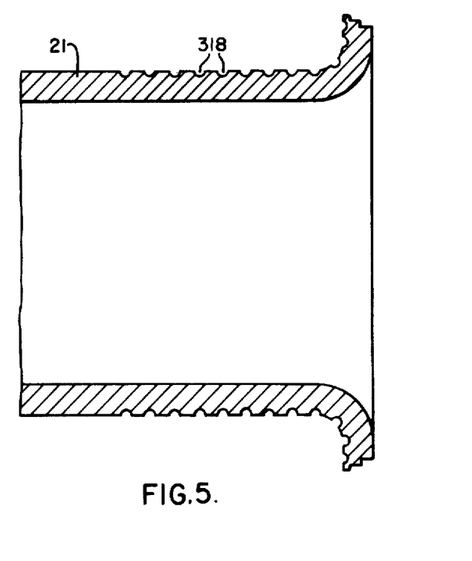
FIG. 5 is a fragmentary view of one electrode, which may be either the upstream or the downstream electrode, the electrodes being interchangeable, showing a portion of the cooled surface of the electrode over which cooling fluid flows, having spoilers over a portion of the length of the wall for increasing heat transfer from the metal of the electrode to the cooling fluid in this area of the electrode, the spoiler configuration of FIG. 5, per se, constituting no part of the instant invention.

Particular reference is made to FIG. 5. The electrodes, for example the downstream electrode 21, as illustrated has spoilers 318 in the wall thereof which will form one of the walls confining the fluid in the fluid passageway 64 for conducting heat from the arcing surface thereof, these spoilers being formed in the wall portion only over the portion of the wall where heat flux may be regarded as critical and where it has been found desirable to increase the heat removal capabilities. The spoilers shown in FIG. 5 constitute no part of the present invention.

Preferably, both of the members 112 and 137 have peripherally spaced pins in the flat portion of the wall thereof which is parallel to the plane of the gap through which gas enters the arc chamber 20. These pins provide initial spacing between the portions of the electrode and keep the fluid passageway open during assembly; after fluid under pressure is passed through the passageways, the pins serve no further purpose, the pins not being shown for convenience of illustration.

With further reference to the operation of the apparatus of FIGS. 1A and 1B, 2A and 2B, 3A through 3F, and FIG. 4 the arc 104a shown in the very narrow gap 25 is the initial spark formed by electrical flashover between electrodes, it being recalled that a system voltage is always maintained between electrodes sufficient to cause flashover. The arc is extended rapidly by the high velocity gas and in the operation of the device the arc path is continually changing and becoming more extended until it perhaps assumes a position similar to that shown at 104, FIG. 1A, which was chosen to indicate the arc path just before breakdown occurred in the gap, but it should be clearly understood that there is no established arc path which is maintained for any substantial period of time, the arc being very short when it is initiated by breakdown in the gap, progressively becoming elongated, and may assume longer and longer paths which extend further and further down the electrodes; the ends of the arc, or the points of attachment, may be rotating at different velocities, and the arc may form a spiral path. Furthermore, it will be understood that in any position, including an arc path shown at 104a as well as an arc path shown at 104, the arc is substantially continually rotated around and between the electrodes by forces exerted thereon by a magnetic field or fields set up by at least two of the four field coils generally designated 129, 130, 141 and 142.

As previously stated, the size of the gas feed openings between passageways 73 and 74 and gas headers 71 and 72 may be varied at will be selecting components having the desired opening sizes, so that the mass flow rate of gas entering the arc chamber 20 may be varied. It will be understood that this mass flow rate is controllable in part by the size of the passageways and controllable in part by the pressure of the gas fed into gas inlet 75.

At the point where the gas passes from manifolds 298 and 299 into electrode plate 83 and 89 there are orifices trapped therebetween for the dual purpose of regulating gas flow, and dividing the flow to each electrode plate equally. These orifices may be changed by removing manifolds 298 and 299.

It will be further understood that means are provided where needed for securing the various parts of the arc heater apparatus to each other, these not being described in detail, but being in the main devices which one skilled in the art would recognize as necessary or desirable and would employ.

Particular attention should be paid to the method of holding the two electrodes tightly together during operation of the arc heater. This is accomplished by first tightening nut 308 so that it engages tube 44, when tightening nuts 287 and 288 to a predetermined torque sufficient to overcome, the internal pressure of the heater. The shafts 267 and 268 pull on the downstream electrode assembly and the tube assembly 42 pushes on the upstream electrode assembly. The trunnions insure that no loading occurs other than axial when tightening the nuts.

Particular reference is made to FIG. 4. Radially extending slots 55 in manifold ring 53 are shown. Annular gap 69 provides the gas header 76, FIG. 1B. Annular lip portion 58 corresponds to the annular lip portion of FIG. 1B. Circle 48a in dashed line indicates the relative position of the lower surface of radially extending electrode lip 48, and circle 126a in dashed line indicates the relative position of the upper or inner surface of axially extending flange portion 126, FIG. 1B.

The apparatus offers a number of advantages not found in prior art arc heater apparatus. In prior art arc heaters, the velocity of the gas has had to be limited because above a certain velocity it caused instability of the arc; in this arc heater the problem of arc instability is substantially eliminated by the feature of spark breakdown in the electorde gap, and the arc can never be extinguished while the required back-up or system voltage is maintained.

Furthermore, the cyclic arc elongation and gap breakdown produces much greater turbulence in the gas in the arc chamber with increased heating efficiency, and where chemical conversion is one of the objectives of the use of the arc heater, chemical recombination is enhanced by the increased turbulence in the gas. Additionally, this arc heater is especially suitable for use where a particulate solid is at least one material introduced into the arc heater; the gas passes through the narrow gap at such a very high velocity that it is practically impossible for any of the particulate solid to pass through the gap and deposit on the electrical and gap insulating plate 51 or other insulating surface to the derogation of the insulating properties of the material. By utilizing two field coils in each electrode, increased flexibility in adjustment of the strength and/or configuration of the magnetic field is provided. By utilizing long substantially cylindrical electrodes with elongated arcing surfaces which provide substantially the entire wall enclosing the arc chamber, the volume into which the arc may be expanded is increased, the possibility of the arc striking to some surface other than the electrode is practically eliminated.

Further, the gas itself acts as an electrical insulator between the electrode potentials, and is subject to higher electrical stress than any other insulation in the arc heater; therefore, there is no tendency to spark-over at any other location than the electrode minimum gap. In other words, the active insulation between electrodes is a stream of high speed gas.

The electrode geometry is very simple, and electrode cost is greatly reduced. The electrodes are slidably removable from the electrode assemblies after the arc chamber has been opened; electrode change time is measured in minutes, not hours or days as is the case in prior art arc heaters.

The spark-over feature results in very high power factors, greatly increased over prior art alternating current arc heaters.

There is no upper limit on the gas flow rate; in practice, no maximum gas flow has been obtained. It has been found impossible to increase gas flow rate to the point of arc extinction.

The arc heater of our invention is not limited in length; the electrodes could be made longer and the number of field coils axially spaced along each electrode could be increased. In certain applications, it may be desirable to shorten the electrodes and reduce the $L/D$ ratio, and use only one field coil around each electrode. The most desirable $L/D$ ratio may change from gas to gas, and will be affected by the gas flow rate.

The downstream portion of the arc heater is operated or operable at ground potential, thus protecting attaching downstream equipment from ground arcing.

Our invention includes the use of a water-cooled nozzle which can be attached to the downstream electrode for those applications requiring high pressure operation or supersonic expansion for quenching of the reactants.

Figure 6:
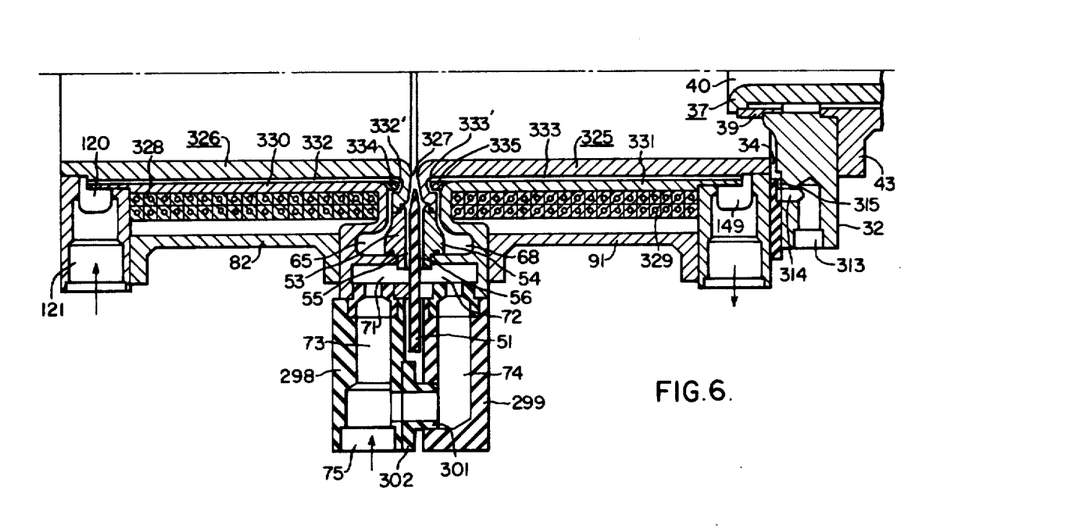
FIG. 6 is a view of an additional embodiment of the invention in which the electrodes are especially shaped and the fluid passageway therein, are especially shaped to provide improved cooling in the portions of the arcing surfaces of the electrodes at or near the gap between electrodes.

Particular reference is made to FIG. 6 where an additional embodiment of the invention is shown. In FIG. 6, the downstream and upstream electrodes are generally designated 326 and 325 with a narrow gap 327 therebetween, the electrodes having field coils 328 and 329 therein respectively for setting up magnetic fields or a resultant magnetic field for exerting a force or forces on the arc causing the arc to rotate. One of the most significant manners in which the structure of FIG. 6 differs from that of FIG. 1, is that the inner cylindrical metallic portions of the electrodes, these being shown at 330 and 331 respectively, these defining the fluid passageways 332 and and 333 respectively, are so shaped, and have annular lip portions 334 and 335 respectively, that the portion of the fluid passageway designated 332' and 333' are very close to the portion of the arcing surface where the gap 327 is at a minimum dimension and heat flux removal from this important area of the electrode, where the arc is in the gap between electrodes or is attached to the electrodes at positions very close to the gap, is enhanced. After spark-over in the electrode gap 327 occurs, a very hot and intensely powerful arc may be formed in this short gap region between electrodes for a brief instant before it is blown out of the gap so that any improvement in heat flux removal capability in this region reduces the possibility of degradation of material due to arc action on the electrodes.

Figure 7:
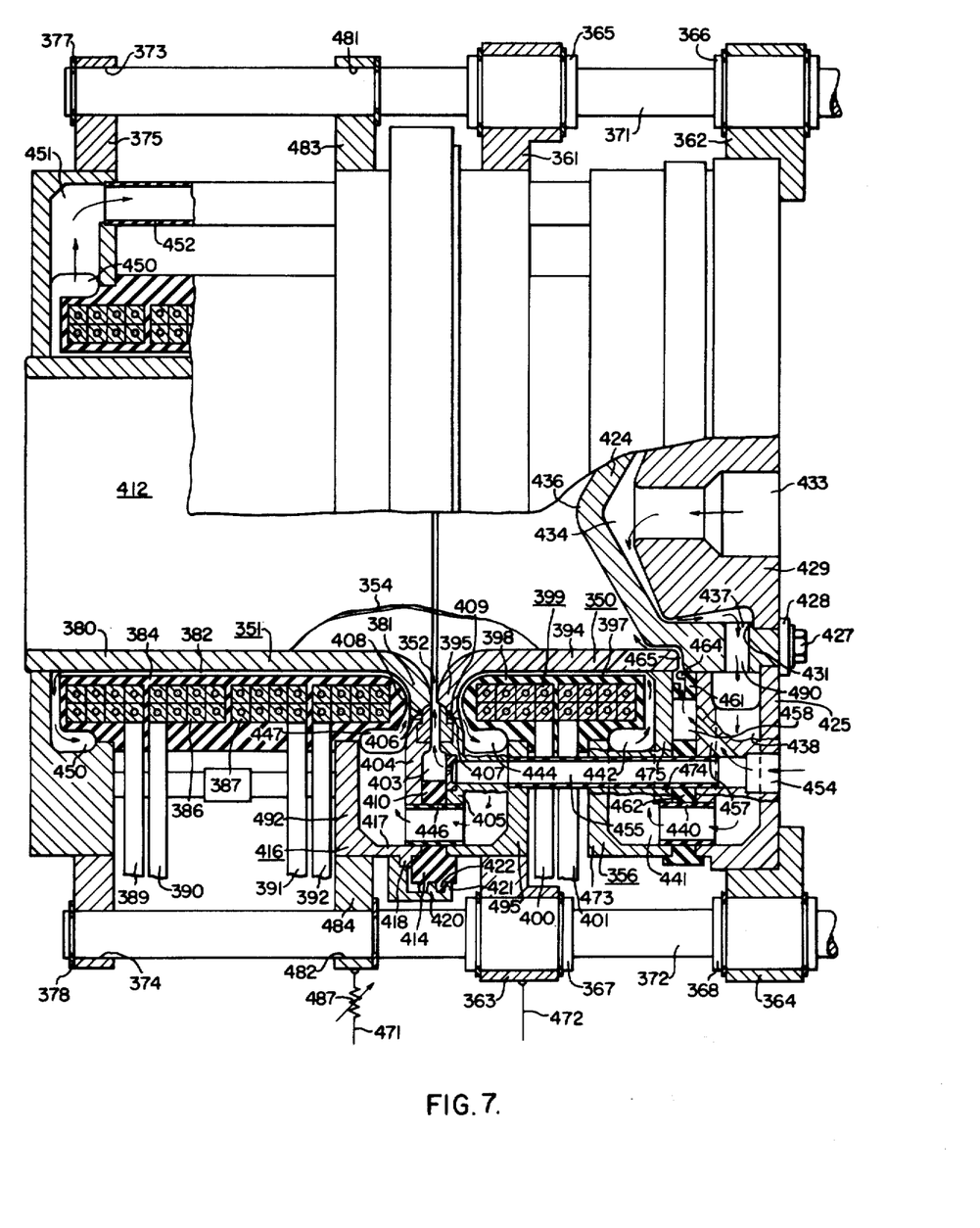
FIG. 7 is a view of a further embodiment of the invention in which the end plate closing the upstream end of the arc heater has no feed stock tube extending therethrough for bringing a particulate solid or an additional gas of fluid into the arc chamber.

Particular reference is made to FIG. 7 where a further embodiment of our invention is shown. In FIG. 7, the upstream and downstream electrodes are generally designated 350 and 351 respectively. The gap between electrodes is shown at 352. The arc between electrodes 350 and 351 is shown taking place at 354, but as with the other embodiments of the apparatus, it will be understood that the arc path at 354 does not represent a path having any permanence, but represents one of many possible arc paths which may be progressively increasing in length which the arc would take before it becomes so elongated that breakdown recurs in the gap, it being understood that a system voltage is maintained across electrodes 350 and 351 at all times sufficient to cause breakdown in the gap 352. The arc after forming in the gap at electrical breakdown is immediately blown out of the gap by high velocity gas admitted through the narrow gap in a manner similar to that heretofore described.

The upstream electrode assembly generally designated 356 is shown to be secured to members 361–364 all of which have therein linear ball bearings in bushings 365–368 respectively which are axially slidable on the two tie rods 371 and 372. It will be understood that means, not shown for convenience of illustration, supports the right-hand ends of the tie rods, the left-hand ends of the tie rods 371 and 372 passing through bores 373 and 374 in an annular rim member 375, secured by means, not shown for convenience of illustration, to the remainder of the arc heater structure, and that the tie rods 371 and 372 are anchored against axial movement in the bores 373 and 374 by the slotted washers 377 and 378. The downstream electrode 351, in addition to having the cylindrical portion 380 with the curved radially extending lip 381, these being composed of electrically conductive material having a high thermal conductivity such as copper, has immediately back of the outer wall surface of the portion 380 a fluid passageway 382 for the flow of cooling fluid to conduct heat flux from the arcing surface, and the other wall of the fluid passageway is defined by a field coil housing 384 shown as composed of electrically insulating material and having therein two field coils 386 and 387. The field coils are composed of turns of hollow conduit electrically insulated from each other, conduit extensions 389 and 390 of coil 386 serving for bringing fluid to and from the field coil, and also serving as electrical connections to a source of potential, not shown for convenience of illustration, for energizing the field coil to set up a magnetic field. Likewise, conduit extensions 391 and 392 of field coil 287 serve for bringing cooling fluid to and from the coil and also serve as electrical connections to a source of potential, not shown, for energizing the field coils.

It will be understood that whereas the insulating surface of the coil housing 384 is shown as defining the fluid passageway 382, that if desired, interposed between the insulating structure and the fluid passageway there could be a metallic portion in accordance with the practice shown in FIG. 1A and also in the apparatus of FIG. 6. A further example of the structure contemplated may be found in Pat. No. 3,343,019 to C. B. Wolf et al. for "High Temperature Gas Arc Heater With Liquid Cooled Electrodes and Liquid Cooled Chamber Walls," assigned to the assignee of the instant invention.

The upstream electrode assembly generally designated 356 in addition to having the generally cylindrical metallic electrode portion 394 composed of material having high electrical and thermal conductivity, with the curved radially extending lip 395 has a space between the outside wall of the electrode portion 394 and the adjacent wall of the coil housing 398, this space or passageway 397 forming a passageway for the flow of cooling fluid to conduct heat flux from the arcing surface of the electrode 350. Disposed within the coil housing 398 there is a magnetic field coil generally designated 399 with conduit extensions 400 and 401 for bringing cooling fluid to and from the coil and for bringing an energizing current to the coil.

A gas header 403 which extends around the entire arc heater and which communicates around the entire periphery of the arc heater with the gap 352 is defined by two ring-like members 404 and 405 each of which has a radially inwardly extending lip portion 406 and 407 respectively which abut against the shoulders of lip portions 408 and 409 of the electrodes thereby maintaining the width of the gap 352. It is seen that members 404 and 405 are maintained in spaced position by an annular ring 410 composed of insulating material.

The arc chamber generally designated 412 is maintained in a closed and sealed condition by annular threaded member 414 composed of electrical insulating material which is secured by means, not shown, for convenience of illustration, to the upstream electrode assembly generally designated 356. The downstream electrode assembly generally designated 416 has an axially extending cylindrical lip portion 417 extending in the direction of the upstream electrode assembly with an outwardly flaring ridge 418 near the end thereof, and has mounted for rotation with respect to member 417 a threaded locking ring 420 prevented from sliding off of the cylindrical lip portion 417 by the aforementioned ridge 418, the locking ring 420 having threads 421 which engage threads 422 on the aforementioned threaded member 414 which is secured to the upstream electrode assembly, and thereby the arc chamber is sealed and maintained in sealed position.

The upstream end of the arc chamber 412 is closed by a closure member generally designated 424 which is secured in an end plate 425 forming part of the pressure vessel by peripherally spaced bolts, one of these bolts being shown at 427. Bolt 427 has a large washer 428 thereon which secures a large fluid inlet member 429 with the flange portion thereof abutting against a shoulder 431 formed in the closure member 424.

All of the fluid for cooling the end plate and for cooling the electrodes enters the arc heater through the large fluid inlet 433 at the upstream end, thence passes into a wide and extended passageway 434 back of that portion 436 of the closure member 424 which has a surface exposed to the hot gases in the arc chamber 412 and exposed to the heat of radiation from the arc. From passageway 434 fluid passes through radially extending passageways 437 which may constitute a manifold in the closure member into a circumferentially extending header 490 and from thence by way of radially extending passageway 438 within the aforementioned end plate forming part of the pressure vessel, thence through the tube of insulating material 440 which in addition to other insulating material electrically insulates the end plate and the closure member 424 from the upstream electrode, thence through passageway 441 into fluid header 442 thence down the aforementioned cylindrical passageway 397 of the upstream electrode 350, thence into fluid header 444 thence through the tube of insulating material 446 which in addition to the ring member 410 and the insulated threaded member 414 electrically insulates the upstream electrode from the downstream electrode, thence into fluid header 447, thence into passageway 382 in the downstream electrode, thence into fluid header 450 which communicates with passageway 451, which passageway header 455 opens into and communicates with a tube of insulating material 452 which extends the length of the arc heater apparatus, but not necessarily in the same plane which is illustrated in the lower cross-sectional portion of the figure, and thence tube 452 connects at the right-hand extremity thereof with fluid outlet means, not shown, for example a flexible hose.

The path of the fluid in the aforementioned channeling arrangement is indicated by the spaced arrows therein.

The major portion of the gas to be heated is brought in through gas inlet 454, thence passes through the passageway 455, thence into the gas header 403, and thence through the gap 352 between electrodes to be heated by the arc in the gap or the arc within the arc chamber 412 after it is periodically blown from the gap. It is seen that communicating with the gas inlet 454 by way of passageway 457 is an additional gas header 458 formed in the space between two radially spaced annular ring members of electrically insulating material 461 and 462, which form part of the electrical insulation between the upstream electrode and the closure member and end plate. The annular ring member 461 has a plurality of peripherally spaced and radially extending bores or passageways 464 therein which admit gas into the space 465 between the upstream end of the upstream electrode and the adjacent wall of closure member 424 this space also extending in a cylindrical, or axial direction a certain distance and separating and electrically insulating the arcing surface from the adjacent surface of the closure member, gas entering the arc chamber 412 in substantially a cylindrical passageway around the entire periphery of the closure plug in the path generally indicated by the arrow at this position.

It will be understood that for simplicity of illustration, a number of O-ring seals seated in annular grooves have not been shown. These are provided wherever necessary to provide fluid tight seals for the fluid passageway and gas tight seals for the gas passageways.

Leads 471 and 472 symbolize means for connecting the electrodes across a source of energizing and arc-producing potential, not shown for convenience of illustration, and which may be either alternating current or direct current as desired. Lead 471 represents a simplified electrical connection directly to the metallic and electrically conductive member 484 of the downstream electrode assembly 416. Member 484 is firmly connected to electrically conductive member 492, of which portion 404 is an integral part. Current then passes from lip 406 of portion 404 to lip 408 of electrode 351. Member 363 to which lead 472 is connected, is firmly connected to electrically conductive member 495, of which portion 405 is an integral part. Current then passes from lip 407 of portion 405 to lip 409 of electrode 350.

Rheostate 487 in lead 471 symbolizes means for adjusting the value of the arc current.

To provide additional rigidity for the structure, the tie rods 371 and 372 are seen passing through bores 481 and 482 in additional members 483 and 484 secured to the downstream electrode assembly generally designated 416 by means, not shown for convenience of illustration.

Further summarizing the advantages of all of the embodiments of our apparatus shown, the greatly extended arc provides for more efficient heating of the gas together with a greatly increased gas flow rate without arc instability and the pressure perturbations caused by large power fluctuations result in increased turbulence with more uniform heating of the gas, and where chemical conversion is an object of the use of the arc heater, the pressure perturbations greatly add to the turbulence caused by the high speed of arc movement and add to that caused by the rate of reversal of the direction of arc movement where alternating current supplies the arc. In chemical processing, a reduction in the reactant enthalpy requirement and a reduction in the specific energy requirement of the chemical product may also result. The field coils exert a force or forces on the arc however extended it becomes before gap breakdown with improvement in the arc rotating capabilities over prior art arc heaters.

The gap insulating plate with the slotted manifold members on each side thereof provides a convenient means of bringing in the gas in a substantially cylindrical path around the gap around the entire perimeter of the arc chamber, and provides for maintaining the spacing of the electrode gap, the spacing being changed at will by changing the insulating plate and substituting another insulating plate to give a desired change in the gap length. The use of two magnetic field coils near each arcing surface in the embodiment of FIG. 1 with means for varying the electrical connections of the field coils at will provides for improved control of forces exerted on the arc in accordance with many factors which affect the desired field strength, these including the arc current, the mass flow rate of the gas, the length of the gap and the voltage which has to be maintained between electrodes to insure that a system voltage is available at all times to cause breakdown in the gap, the viscosity of the fluid or fluids admitted to the arc chamber, whether or not a particulate solid is admitted to the arc chamber, and numerous other factors which will be readily apparent to one skilled in the art.

As previously stated, high velocity gas entering the arc chamber through the electrode gap helps to insure that particles of a particulate solid which are admitted through the feed tube at the upstream end of the arc heater, FIGS. 1A and 6, cannot easily pass through the minimum gap and form a deposit on the insulating plate thereby reducing its insulating properties.

In all embodiments, the arc chamber may be quickly opened to perform any operation which is desired, and may be quickly closed; in some cases, for example FIG. 1A, no major fluid or gas connections need to be disconnected, and no electrical connections need to be disconnected, and it will be understood that the conduit extensions to the upstream electrode of FIG. 7, may connect to flexible electrical leads for bringing an energizing current to the field coil of the upstream electrode and that the conduit extensions may be connected to flexible hoses so that no disconnections are necessary with respect to the field coil when the arc chamber 412 of FIG. 7 is open for inspection, cleaning, testing, etc.

In the claims appended hereto, the terms "system voltage" and "back-up voltage" are used synonymously.

We claim as our invention:

1. In arc heater apparatus, in combination, means defining an arc chamber and including a pair of axially spaced substantially cylindrical electrodes forming a narrow gap therebetween and adapted to be connected to a source of potential to produce an arc therebetween, and means spacing and electrically insulating the electrodes from each other, said last-named means including a ring of insulating material having on each side thereof means for channeling gas to be heated at a high velocity to the gap between electrodes, said means for channeling gas including an electrically conducting means whereby said source of potential is electrically applied to said cylindrical electrodes to produce said arc, said high velocity gas being initially provided to flow through said gap by said channeling means in a direction generally radially with respect to the axis of said cylindrical electrodes to forcefully elongate said arc and blow a portion of said arc into said arc chamber.

2. Arc heater apparatus according to claim 1 in which the means on each side of the gap insulating ring for bringing gas to be heated to the gap is a manifold ring having a plurality of peripherally spaced slots therein extending radially completely through a portion of said ring.

3. Arc heater apparatus according to claim 2 in which the slots in the manifold rings extend thereon at predetermined angles with respect to a selected dimension of the means defining an arc chamber.

4. Arc heater apparatus according to claim 1 in which the electrodes include means for fluid cooling said electrodes to conduct heat flux from the arcing surfaces thereof.

5. The combination as claimed in claim 4 in which said gas channeling means includes means for cooling said gas channeling means, said means for cooling said electrode and said means for cooling said gas channeling means being connected to provide a single cooling means.

6. Arc heater apparatus according to claim 1 including in addition magnetic field generating means mounted close to the electrodes and generating a magnetic field which exerts a force on the arc which causes the arc to rotate substantially continuously over the arcing surfaces of the electrodes.

7. Arc heater apparatus according to claim 1 including in addition manually operable means to clamp the electrodes and spacing means together to form a sealed arc chamber, said manually operable means permitting the arc chamber to be quickly opened.

8. Arc heater apparatus according to claim 1 in which the means defining an arc chamber includes an upstream end plug having means therein for feeding material into the arc chamber.

9. Arc heater apparatus including, in combination, first and second electrode assemblies including first and second generally cylindrical electrodes respectively, the electrodes being axially spaced from each other to form a narrow gap, the electrodes being adapted to be connected to a source of potential to produce an arc therebetween, the electrodes having at the adjacent ends thereof curved portions terminating in substantially radially extending portions, and means spacing and electrically insulating the electrodes from each other, said means spacing and electrically insulating the electrodes from each other including an electrically insulating gap ring, and first and second manifold rings mounted adjacent the opposite sides of said gap insulating ring and cooperating with such said radially extending portions to form gas injection paths into said gap.

10. Arc heater apparatus according to claim 9 in which the radially extending portions of the first and second electrodes have radially extending annular lips, and in which the first and second manifold rings have radially extending annular portions extending toward the axis of the electrodes and which engage the annular lips of the first and second electrodes respectively.

11. Arc heater apparatus according to claim 9 in which the first and second electrode assemblies each include magnetic field producing means for generating a magnetic field to control the arc between the first and second electrodes.

12. Arc heater apparatus according to claim 9 in which the first and second electrode assemblies include means forming fluid flow passageways adjacent the outside walls of the first and second electrodes for the flow of cooling fluid to conduct heat flux from the arcing surfaces of the electrodes.

13. In arc heater apparatus, in combination, a first electrode, a second electrode spaced therefrom and forming a gap therebetween for the formation of an arc, the first and second electrodes being adapted to be electrically connected to a source of potential to produce said arc, supporting structure including first and second electrode assemblies adapted to have said first and second electrodes slidably inserted therein respectively and slidably removed therefrom, and manually operable means operatively connected to said first and second electrode assemblies for clamping the electrode assemblies while the electrodes are positioned therein to form a sealed arc chamber, said first and second electrodes being generally cylindrical in shape, said first and second electrode assemblies including first and second cylindrical members composed of electrically conductive material and means for spacing the wall of said cylindrical electrode from the wall of smaller diameter of the adjacent cylindrical member while the electrodes are slidably inserted in the electrode assemblies to define cylindrical fluid flow passageways for the flow of cooling fluid to conduct heat flux from the arcing surfaces of said electrodes.

14. Arc heater apparatus according to claim 13 in which the electrode assemblies include fluid headers communicating with the respective passageways adjacent the electrodes for the flow of cooling fluid, and the supporting structure includes fluid inlet and fluid outlet means and means for connecting a fluid header in the first electrode assembly with a fluid header in the second electrode assembly while the assemblies are clamped together to form a sealed arc chamber to provide a fluid passageway between the last named two fluid headers.

15. In arc heater apparatus, in combination, a first electrode, a second electrode spaced therefrom and forming a gap therebetween for the formation of an arc, the first and second electrodes being adapted to be electrically connected to a source of potential to produce said arc, supporting structure including first and second electrode assemblies adapted to have the first and second electrodes slidably inserted therein respectively and slidably removed therefrom, and manually operable means operatively connected to the first and second electrode assemblies for clamping the electrode assemblies while the electrodes are positioned therein to form a sealed arc chamber, said first and second electrode assemblies including first and second magnetic field generating means respectively for setting up at least one magnetic field which exerts a force on the arc which causes the arc to move substantially continuously over the arcing surfaces of the first and second electrodes.

16. In arc heater apparatus, in combination, a first electrode, a second electrode spaced therefrom and forming a gap therebetween for the formation of an arc, the first and second electrodes being adapted to be electrically connected to a source of potential to produce said arc, supporting structure including first and second electrode assemblies adapted to have the first and second electrodes slidably inserted therein respectively and slidably removed therefrom, manually operable means operatively connected to the first and second electrode assemblies for clamping the electrode assemblies while the electrodes are positioned therein to form a sealed arc chamber, means for spacing the first and second electrodes for each other including a gap insulating ring with manifold rings on each side thereof for bringing gas to the gap and passing gas through the gap.

17. Arc heater apparatus according to claim 16 wherein the means for passing gas through the gap includes means forming a plurality of peripherally spaced passageways extending completely through a portion of said means for passing gas toward the gap at predetermined substantially similar angles.

18. In arc heater apparatus, in combination, first and second electrodes spaced from each other, the electrodes being so shaped and mounted with respect to each other that a narrow annular gap is formed between electrodes, the electrodes being adapted to be connected to a source of potential to produce sparkover in said gap and initiate an arc, the source of potential always apply across the electrodes a backup or system voltage sufficient to cause electrical breakdown in said gap, means for passing gas to be heated through said gap at at least a plurality of positions around the periphery of the gap, the gas to be heated being passed through the gap at a high velocity, the electrodes being so shaped that the high velocity gas can blow the arc out of the narrow gap to a position on the arcing surfaces of the electrodes where the arc can become elongated to a length at least several times as great as the length thereof while in said gap.

References Cited
UNITED STATES PATENTS

| | | | |
|---|---|---|---|
| 988,862 | 4/1911 | Conley | 219—383 X |
| 1,632,821 | 6/1927 | Cote | 219—383 |
| 3,531,275 | 9/1970 | Majmisson et al. | 13—18 X |
| 3,379,908 | 4/1968 | Kememy et al. | 219—123 X |
| 3,531,275 | 9/1970 | Majmisson et al. | 13—18 X |
| 3,309,550 | 3/1967 | Wolf et al. | 313—231 |
| 3,343,019 | 9/1967 | Wolf et al. | 313—32 |
| 3,445,191 | 5/1969 | Bruning et al. | 23—277 |
| 3,522,015 | 7/1970 | Maniero et al. | 23—277 |

OTHER REFERENCES

Technical Documentary Report No. RTD-TDR-63-4055, "Development of High Enthalpy, High Power Arc Air Heaters," Sarlitto et al., Air Force System Command, Wright-Patterson Air Force Base, Ohio, February 1964, p. 72.

VOLODYMYR Y. MAYEWSKY, Primary Examiner

U.S. Cl. X.R.

23—277; 204—311; 219—123; 313—32, 156, 231; 315—111